US00RE34994E

United States Patent [19]

Bonyman

[11] E Patent Number: Re. 34,994

[45] Reissued Date of Patent: Jul. 11, 1995

[54] JIG FOR CURVED MOLDINGS

[76] Inventor: Robert L. Bonyman, 70 Chestnut Rd., Tewksbury, Mass. 01876

[21] Appl. No.: 76,392

[22] Filed: Jun. 14, 1993

Related U.S. Patent Documents

Reissue of:

[64] Patent No.: 5,143,130
Issued: Sep. 1, 1992
Appl. No.: 772,063
Filed: Oct. 7, 1991

[51] Int. Cl.[6] ..... B27B 27/02; B27C 5/02

[52] U.S. Cl. ..... 144/253 F; 83/421; 83/447; 144/114 R; 144/253 R

[58] Field of Search ..... 144/114 R, 134 R, 249 R, 144/249 B, 253 R, 253 F, 253 J; 83/421, 436, 446, 447

[56] References Cited

U.S. PATENT DOCUMENTS 1,626,153 4/1927 Reaveley .
2,699,804 1/1955 Starnes ..... 144/253
2,783,796 3/1957 Patterson .
3,009,494 11/1961 Hinkley .
3,267,978 8/1966 Poole .
4,306,598 12/1981 Peot .
4,372,351 2/1983 Myers .
4,567,927 2/1986 Plamann .
4,688,612 8/1987 Kessel et al. .
4,798,506 1/1989 Kulp, Jr. .
4,825,920 5/1989 Evitts .
5,058,474 10/1991 Herrera ..... 144/253 F

FOREIGN PATENT DOCUMENTS 36747 8/1886 Germany .

*Primary Examiner*—W. Donald Bray
*Attorney, Agent, or Firm*—Kilpatrick & Cody

[57] ABSTRACT

A jig adapted for use with a conventional molder-planer for cutting work on curved wood sections. For this purpose, the present invention includes a base with the jig mounted thereon. The base bolts onto the table of the molder-planer so that the jig is positioned directly under the molder-planer cutter head. The jig is comprised of a set of two guide wheels permanently mounted in a side-by-side relationship on one side of the plate, and two adjustably mounted pneumatic cylinders, each with a guide wheel bolted to the end of the piston rod, mounted opposite to the permanent guide wheels.

22 Claims, 2 Drawing Sheets

FIG. 2
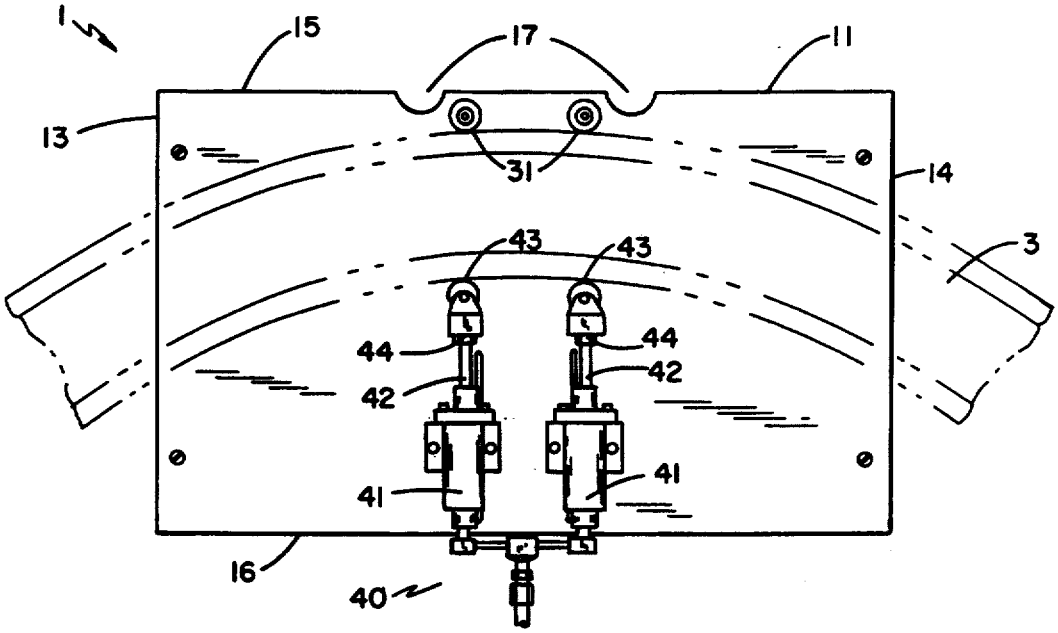
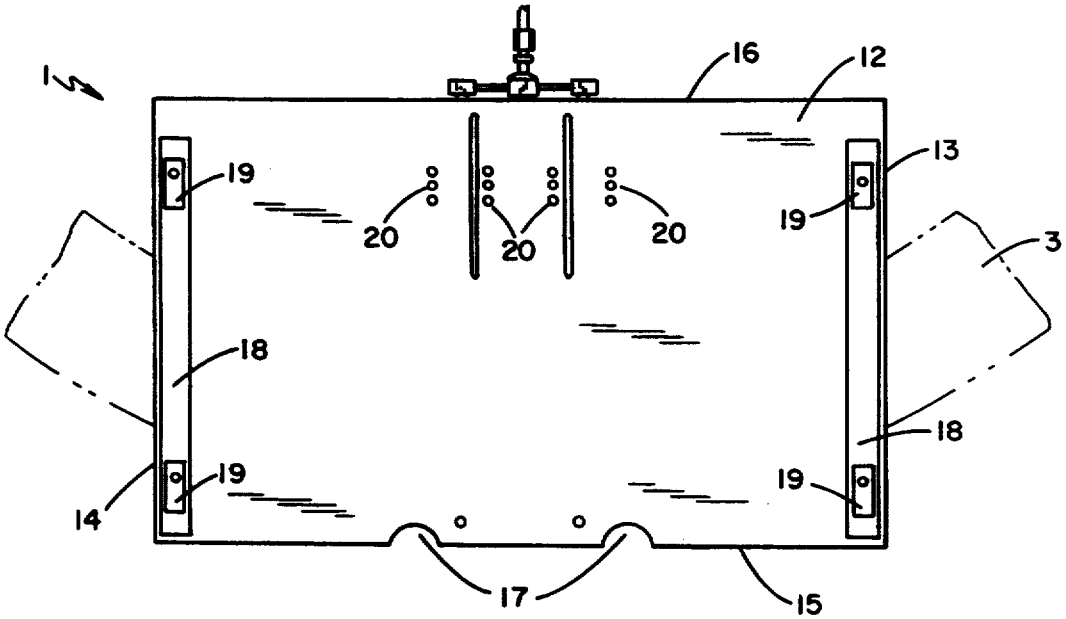
FIG. 3

JIG FOR CURVED MOLDINGS

Matter enclosed in heavy brackets [ ] appears in the original patent but forms no part of this reissue specification; matter printed in italics indicates the additions made by reissue.

BACKGROUND OF THE INVENTION

This invention relates to woodworking, and more particularly to a jig for guiding wood of anv curvature in a path for engagement with a cutting tool.

Curved moldings for arched doorways, circular windows, and other radial shapes are difficult to produce. Elliptical moldings present even greater difficulties. Most cutting tools are designed for straight cutting and not for cutting curved pieces. In large-scale mass production of woodwork items, the design and manufacture of a jig or fixture for forming radial cuts may be justified. However, for many woodworking operations, particularly for example, the custom manufacture of moldings and made to order specialty items, the manufacture of a suitable jig or fixture is not cost-justifiable. In such cases cutting on the curved work pieces must be accomplished by the relatively crude procedure of drawing curved lines on the workpiece to be cut and then cutting along the line by hand, which produces imprecise results even by the most skilled woodworker.

SUMMARY OF THE INVENTION

It is accordingly an object of the present invention to provide a simple and effective, yet inexpensive, jig which is adapted for use with a conventional molder-planer for cutting work on curved wood sections.

For this purpose, the present invention includes a base with the jig mounted thereon. The base bolts onto the table of the molder-planer so that the jig is positioned directly under the molder-planer cutter head. The jig is comprised of a set of two guide wheels permanently mounted in a side-by-side relationship on one side of the plate, and two adjustably mountcd pneumatic cylinders, each with a guide wheel bolted to the end of the piston rod, mounted opposite to the permanent guide wheels.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 2 is a top plan view of the jig of FIG. 1 without the molder-planer mounted thereon; and FIG. 3 is a bottom view of the base of the present invention.

DETAILED DESCRIPTION OF THE INVENTION

Figure 1:
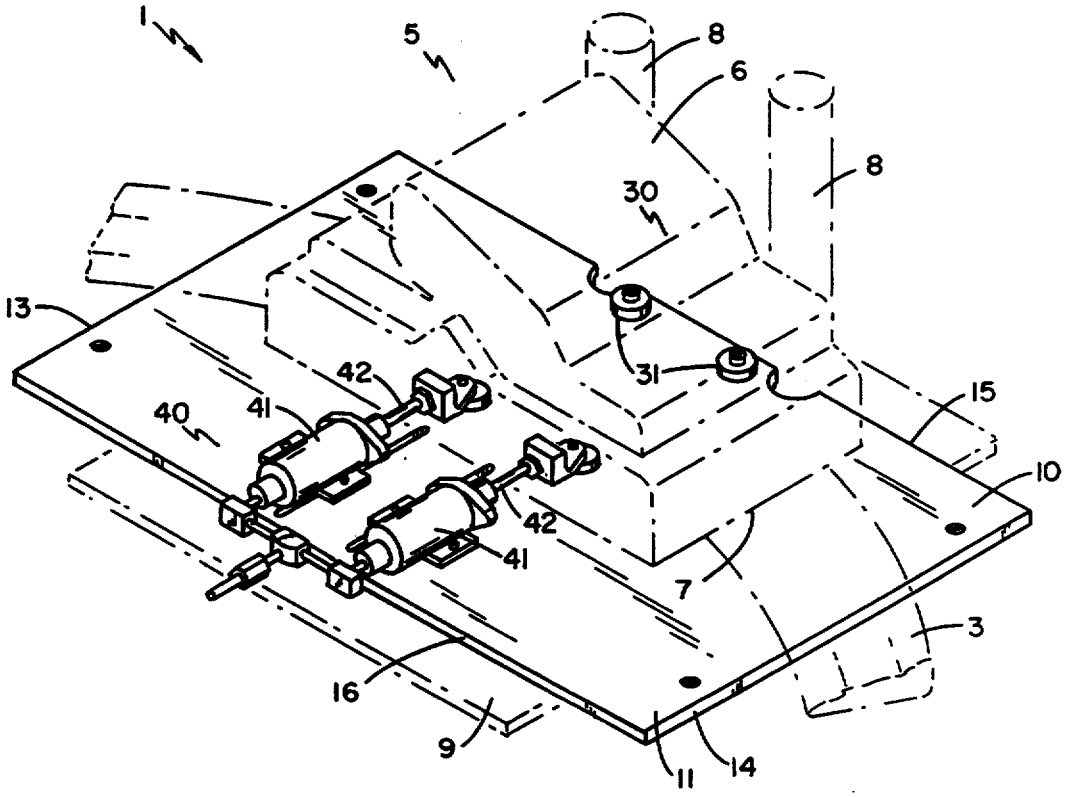
FIG. 1 is a perspective view the preferred embodiment of the jig of the present invention in use with a conventional molder-planer for cutting a curved length of molding.

Referring to the drawings in detail wherein like elements are indicated by like numerals, there is shown a jig 1 constructed according to the principles of the present invention for use with a conventional molder-planer 5 having a housing 6, cutter head 7, vertical support rods 8, and a table 9. The jig 1 incorporates a base 10, a fixed guide wheel assembly 30 and an adjustable guide assembly 443. The jig 1 connects to the molder-planer table 9 directly under the molder-planer cutter head 7 and guides wood 3 of virtually any curvature under the cutter head 7.

The jig base 10 is a flat, horizontal, generally rectangular plate which has a top face 11, under face 12, front 13, back 14, left side 15, and right side 16. The longitudinal axis of the plate 10 is from front 13 to back 14. The positions of each major component will be described in terms of its relationship with the base plate 10. Rearward direction is from plate front 13 toward plate back 14. At approximately the one-third and two-third distanee points from front 13 to back 14, the left plate side 15 has two semicircular indentations 17 formed therein. The radii of the indentations 17 is slightly greater than the radius of the molder-planer vertical support rods 80. When the jig 1 is used with the molder-planer 5, the jig base 10 is slid sideways onto the molder-planer table 9 so that the jig base indentations 17 fit snugly against the molder-planer support rods 8. The jig base undersurface 12 has two clamping strips 18 attached thereto, one each along the jig base front 13 and the jig base back 14. Each strip 18 has two swiveling clamps 19 positioned near to the base left and right sides 15, 16. The clamps 18 swivel under the molder-table table 9 edges applying upward pressure and thereby holding the jig base 10 firmly to the molder-planer table 9. In this embodiment of the invention, the base plate is made of ⅜ inch thick aluminum plate.

The jig guide wheel assembly 30 is comprised of two identical guide wheels 31 horizontally positioned against and permanently fixed to the plate top face 11 The guide wheels 31 each have an approximate one inch diameter and are positioned approximately two inches apart. The wheels 31 are located near to the plate left side 15 between the two indentations 17 and lie in the same longitudinal axis parallel to the plate left side 15.

Opposite the guide wheel assembly 30 on the plate right side 16, an adjustable guide assembly 40 is removably mounted to the plate top face 11. The adjustable guide assembly 40 is comprised of two pneumatic cylinders 41 in side-by-side relationship each having a longitudinal axis transverse to the longitudinal axis of the base plate 10. Each cylinder 41 drives a piston arm 42 in a horizontal direction toward the guide wheel assembly 30. Each piston arm 42 has a horizontally positioned guide wheel 43 bolted to its distal end 44. When compressed air is fed into the cylinders 41, the piston arms 42 push out toward the guide wheel assembly 30 thereby holding the wood piece 3 to be cut firmly between the two sets of guide wheels 31, 43. The piston arms 42 provide a "fine" control for holding the wood piece 3. "Gross" control is provided by a series of holes 20 drilled through the plate 10. The cylinders 41 are remounted on the plate 10 as required.

It is understood that the above-described embodiment is merely illustrative of the application. Other embodiments may be readily devised by those skilled in the art which will embody the principles of the invention and fall within the spirit and scope thereof. Hydraulic and electrical systems could easily be used in place of pneumatics.

I claim:

1. A jig for guiding a wood piece of any curvature in a path for engagement with a cutting tool having a cutter head, vertical support rods and a table, comprising:

a base for attachment to said cutting tool table whereby said jig is positioned directly under said cutting tool cutter head;

a guide wheel assembly comprised of a set of two guide wheels permanently mounted in a side-by-side relationship on one side of the base; and an adjustable guide assembly comprised of two removably mounted pneumatic cylinders mounted opposite to the permanent guide wheels on said base, each said cylinder driving a piston arm with a horizontally positioned guide wheel bolted to the piston arm's distal end.

2. A jig according to claim 1, wherein:

said base is a flat, horizontal, generally rectangular plate having a top face, under face, front, back, left side, and right side, and whose longitudinal axis of from front to back.

3. A jig according to claim 2, wherein:

said base undersurface has two clamping strips attached thereto, one each along the jig base front and the jig base back for attachment to said cutting tool table.

4. A jig according to claim 3, wherein:

said guide wheel assembly guide wheels are horizontally positioned against and permanently fixed to the plate top face, and lie in the same longitudinal axis parallel to the plate left side.

5. A jig according to claim 4, wherein:

said adjustable guide assembly pneumatic cylinders lie in side-by-side relationship each having a longitudinal axis transverse to the longitudinal axis of the base plate.

6. A jig according to claim 5, wherein:

each cylinder drives said piston arms in a horizontal direction toward the guide wheel assembly thereby holding the wood piece to be cut firmly between the two sets of guide wheels.

7. A jig according to claim 6, wherein:

two semicircular indentations are formed on the left plate side at approximately the one-third and two-third distance points from front to back, the radii of the indentations being slightly greater than the radius of the cutting tool vertical support rods, wherein said jig base is positioned on the cutting tool table so that the jig base indentations fit snugly against the support rods.

8. A jig according to claim 7, wherein:

said guide wheel assembly wheels have a one inch diameter, are positioned two inches apart, and are located near to the plate left side between the two indentations.

9. A jig according to claim 8, wherein:

each clamping strip has two swiveling clamps positioned near to the base left and right sides, therein said clamps swivel under the molder-table table edges applying upward pressure and thereby holding the jig base firmly to the molder-planer table.

*10. A jig for guiding a wood piece of any curvature in a path for engagment with a cutting tool having a cutter head, vertical support rods, and a table, comprising:*

*(a) a base for attachment to the cutting tool table wherein the jig is positioned under the cutting tool cutter head;*

*(b) a first guide mounted on one side of the base;*

*(c) a second guide mounted on the base opposite the first guide;*

*(d) means for adjusting the distance between the first guide and the second guide for accommodating curved wood pieces of different widths; and*

*(e) means for urging the second guide toward the first guide so that the curved wood piece to be cut is firmly held between the two guides while it is guided under the cutter head.*

*11. The jig of claim 10, wherein the base is a flat, horizontal, generally rectangular plate having a top face, under face, left side, right side, front, and back, and a longitudinal axis from front to back.*

*12. The jig of claim 11, wherein two semicircular indentations are formed on the side of the base at approximately the one-third and two-third distance points from front to back, the radii of the indentations being slightly greater than the radii of the cutting tool vertical support rods, wherein the jig base is positioned on the cutting tool table so that the jig base indentations fit snugly against the support rods.*

*13. The jig of claim 10, further comprising means for ataching the base to the cutting tool table.*

*14. The jig of claim 13, wherein the attaching means include two clamping strips attached to the base undersurface, one each along the jig base front and the jig base back for attachment to the cutting tool table.*

*15. The jig of claim 10, wherein each of the first and second guides comprises at least one guide wheel.*

*16. The jig of claim 15, wherein one of the first and second guides comprises two guide wheels mounted side-by-side.*

*17. The jig of claim 16, wherein the guide wheels lie along an axis generally parallel to the path for engagement with the cutting tool.*

*18. The jig of claim 17, wherein the guide wheels are substantially one inch in diameter, are positioned approximately two inches apart, and are located near to the base left side between the two indentations.*

*19. The jig of claim 15, wherein the second guide further comprises at least one piston arm attached to the urging means into which the guide wheel is attached.*

*20. The jig of claim 19, further comprising a second piston arm positioned beside the first piston arm.*

*21. The jig of claim 20, wherein the piston arms each have a longitudinal axis transverse to the longitudinal axis of the base.*

*22. A jig for guiding a wood piece of any curvature in a path for engagement with a cutting tool having a cutter head, vertical support rods, and a table, comprising:*

*(a) a base for attachment to the cutting tool table wherein the jig is positioned directly under the cutting tool cutter head;*

*(b) a first guide mounted on one side of the base, comprising at least one guide wheel in a side-side-by-side relationship with another guide wheel;*

*(c) a second guide mounted on the base, comprising:*

*(i) at least one piston arm oriented in a side-by-side relationship with another piston arm, wherein the piston arms are spaced opposite the guide wheels of the first guide;*

*(ii) a horizontally positioned guide wheel attached to the distal end of each piston arm;*

*(d) means for adjusting the distance between the first guide and the second guide for accommodating curved wood pieces of different widths; and*

*(e) means for urging the piston arms of the second guide in a horizontal direction toward the guide wheels of the first guide so that the curved wood piece to be cut is firmly held between the two guides.*

* * * * *